United States Patent
Lieberman et al.

(10) Patent No.: US 10,452,464 B1
(45) Date of Patent: Oct. 22, 2019

(54) AUTOMATIC HUMAN CONFIGURATION ERROR DETECTION FOR REOCCURRING EVENTS

(71) Applicant: EMC IP Holding Company LLC, Hopkinton, MA (US)

(72) Inventors: Amit Lieberman, Kefar Saba (IL); Senya Touretski, Ramat Gan (IL); Shai Harmelin, Haifa (IL); Idan Levyl, Kadima-Zoran (IL); Meytal Ashkenazy, Netanya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/282,737

(22) Filed: Sep. 30, 2016

(51) Int. Cl.
*G06F 11/07* (2006.01)
*G06F 11/00* (2006.01)
*G06F 11/30* (2006.01)

(52) U.S. Cl.
CPC .......... *G06F 11/079* (2013.01); *G06F 11/008* (2013.01); *G06F 11/0709* (2013.01); *G06F 11/0727* (2013.01); *G06F 11/301* (2013.01)

(58) Field of Classification Search
CPC .. G06F 11/301; G06F 11/008; G06F 11/0709; G06F 11/079
See application file for complete search history.

(56) References Cited

U.S. PATENT DOCUMENTS

| | | | |
|---|---|---|---|
| 8,046,332 B1 * | 10/2011 | Pruthi | G06F 11/1448 707/644 |
| 2013/0086341 A1 * | 4/2013 | Vasavi | G06F 11/1458 711/162 |
| 2015/0067143 A1 * | 3/2015 | Babakhan | G06F 11/301 709/224 |

* cited by examiner

*Primary Examiner* — Jigar P Patel
(74) *Attorney, Agent, or Firm* — Womble Bond Dickinson (US) LLP

(57) ABSTRACT

Detection of a cause of an error occurring in a data center is provided. A time period between a failure event in the data center and a previous successful event is determined. A set of devices involved in the failure event is generated using a data protection advisor (DPA). Data collected for the set of devices during the determined time period is scanned to detect at least one configuration change made during the determined time period. Based on a result of the scanned collected data, the at least one configuration change is displayed as a potential root cause of the error.

12 Claims, 3 Drawing Sheets

AUTOMATIC HUMAN CONFIGURATION ERROR DETECTION FOR REOCCURRING EVENTS

FIELD

One aspect of the disclosure herein generally relates to data processing and in particular relates to error detection in a data processing system.

BACKGROUND

Data centers commonly provide computational resources to their users in the form of online data storage and/or data processing services. Users often store their valuable data and run their critical software applications at such data centers. Data centers commonly employ virtual machines to provide data processing services to their tenants. As is known, a "virtual machine" is a software implementation of a physical computing machine, which may appear on a network as a distinct computer but may in fact be one of multiple virtual machines running on a single server. Virtual machines are popular in data centers because they are readily transportable between physical servers and thus promote load balancing and the capability to failover from one physical server to another.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In large data centers where errors or failures in processing occur, determining a cause of an error may be very challenging. The inventors herein have recognized that there are many cases in which the cause of an error is related to human error. According to one embodiment discussed herein, for events that occur periodically in the data center, such as performance of a backup or replication of data, occurrence of an error is automatically detected and feedback is provided to a user. In one aspect, the feedback includes suggested approaches for resolving the error.

In this way, errors caused by configuration changes made by a human user may be isolated from the other activities of the data center, and it is possible to accurately and quickly identify a root cause of an error and remedy the error.

Figure 1:
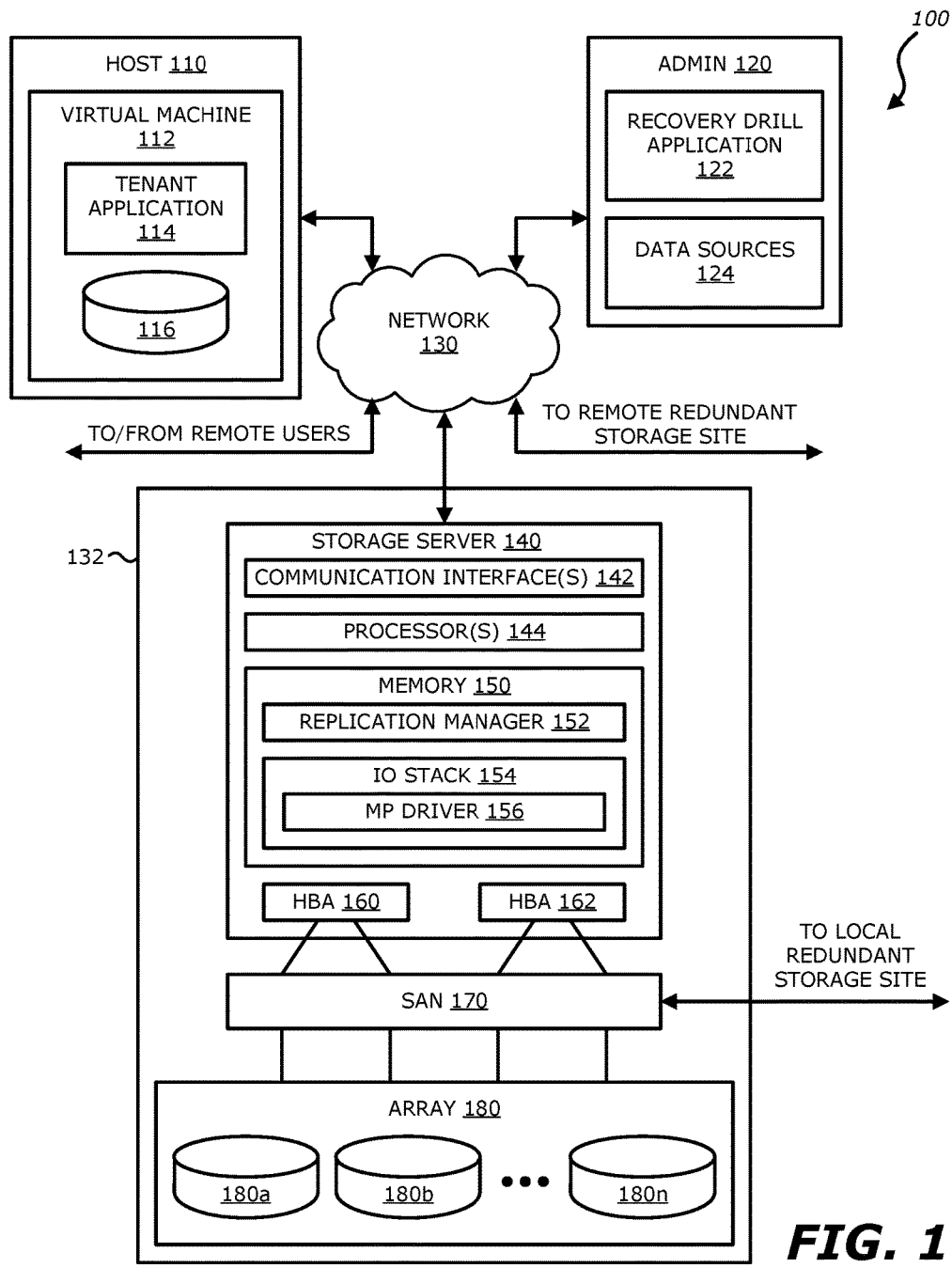
FIG. 1 illustrates a block diagram for explaining an example data center according to an embodiment herein.

Turning to FIG. 1, FIG. 1 illustrates a block diagram for explaining an example data center 100 according to an embodiment herein. FIG. 1 shows an example data center environment 100 in which embodiments of the technique hereof can be practiced. As shown, the data center environment 100 includes a host computer 110, an administrative computer 120, a network 130, and a data storage system 132.

The host computer 110 (i.e., the "host") operates a virtual machine 112, which runs a tenant application 114. The virtual disk 116 is not a physical disk but rather a logical representation of a disk (or set of disks) in memory of the host 110. Although only a single virtual machine 112 is shown, the host 110 may operate a number of different virtual machines at any given time. Also, it is understood that the host 110 may be any type of computing device. In an example, the host 110 is a compute server blade installed in a chassis (not shown) of the data center environment 100. The data center environment 100 will typically include many hosts, like the host 110, which may run the same tenant application 114 or different tenant applications, on behalf of the same tenant or different tenants.

The administrative computer 120 hosts a recovery drill application 122 and various data sources 124. In an example, the recovery drill application 122 is configured to query various elements of the data center environment 100, including the data sources 124. The data sources 124 provide configuration information, settings, and performance information pertaining to the data storage system 132, and may include, for example, administrative tools, drivers, and other programs. As one example, the data sources may include a data protection advisor (DPA) application. Any number of data sources 124 may be provided, and they may be located anywhere in the data center environment 100. The administrative computer 120 may be any type of computing device. In one example, the administrative computer 120 is implemented as a server blade in the same chassis in which the host computer 110 is housed, or in a different chassis. In another example, the administrative computer 120 is itself a virtual machine, which may be hosted by any physical computing device of the data center environment 100.

The network 130 includes a variety of network components, such as Internet Protocol (IP) switches, routers, and cables, for example, and forms an infrastructure for implementing a Local Area Network (LAN) or some other computing network within the data center environment 100. In an example, the network 130 is connected to the Internet, for enabling communication with various remote users and with a redundant storage site (e.g., a replication site). In some examples, the network 130 also includes components for Fibre Channel and/or other block-based protocols, which enable the host 110 to send SCSI (Small Computer System Interface) IO requests to the data storage system 132. Such requests may specify data reads and writes to particular LUNs (Logical Unit Numbers, i.e., logical disk volumes) and particular offset ranges within the LUNs. The network 130 may also convey IO requests from the host 110 to the data storage system 132 in a file-based protocol, such as NFS, CIFS, or SMB 3.0, for example.

The data storage system 132 is seen to include a storage server 140, a storage area network (SAN) 170, and an array 180. In an example, the SAN 170 includes multiple switches for routing IO requests received from the storage server 140 to the array 180. The array 180 includes magnetic disk drives, electronic flashdrives, and/or other non-volatile storage media, shown generally as storage devices 180 a through 180 n. It is understood that the data storage system 132 may include any number of storage servers connected to the SAN 170, and that any number of data storage systems 132 may be provided within the data center environment 100.

The storage server 140 includes a set of communication interfaces 142 (e.g., network interface cards, SCSI adapters, etc.), a set of processors 144 (i.e., one or more processing chips and/or assemblies), memory 150, and host bus adapters (HBAs) 160 and 162. The HBAs 160 and 162 plug into a bus (e.g., a PCI bus) of the storage server 140 and transmit IO requests down paths to the array 180, as managed by the multipathing driver 156, described below. The memory 150 includes both volatile memory (e.g., RAM) and non-volatile memory, such as one or more disk drives, solid state drives (SSDs) and the like.

The memory 150 stores various software constructs. These include, for example, a replication manager 152 and an IO stack 154. The IO stack 154 includes the multipathing (MP) driver 156. It is understood that the memory 150 typically includes many other software constructs, which are not shown, such as an operating system and various applications, processes, and daemons.

The replication manager 152 manages replication of data stored on the array 180 to local and/or remote redundant storage sites. In an example, the replication manager 152 performs both synchronous replication and asynchronous replication. Synchronous replication operates by mirroring data writes sent to the array 180 to the redundant storage as the writes are occurring, i.e., in band with IO requests received by the storage server 140. By comparison, asynchronous replication operates out of band with IO requests based on snaps of data objects stored in the array 180. For example, the replication manager 152 may asynchronously replicate a LUN realized on the array 180 by identifying differences between consecutive snaps of the LUN and sending the differences to the redundant storage site for safekeeping.

The IO stack 154 processes read and write TO requests arriving at the storage server 140. The TO requests may arrive in the form of block-based TO requests (e.g., specifying a LUN and an offset range) or file-based requests (e.g., specifying a particular file system, path, and file name). The TO stack 154 also provides caching services.

The MP driver 156 performs multipathing operations to select particular paths (SCSI "ITLs" or Initiator-Target-LUNs) to be used for transmitting IO requests to the array 180. In an example, the MP driver 156 collects metrics pertaining to the status of different paths between the storage server 140 and the array 180. As will be described, the MP driver 156 may also serve as a data source for the recovery drill application 122.

In operation, the host 110 runs the tenant application 114 in the virtual machine 112, and the tenant application 114 performs reads and writes to the virtual machine disk 116. As the virtual machine disk 116 is not a physical disk but rather a memory construct, the read and write requests to the virtual machine disk 116 are translated into read and write IO requests, which the host 110 sends through the network 130 to the data storage system 132. The storage server 140 processes the TO requests, i.e., via the communication interfaces 142, the TO stack 154, and the HBAs 160 and 162. The TO requests are sent via selected paths to the SAN 170 and then to the array 180, where they are further processed to perform actual read and write operations on the storage devices 180 a through 180 n.

Asynchronously with the operation of the host 110 and the data storage system 132, an administrator of the data center environment 100 may run the recovery drill application 122. In an example, the administrator running the recovery drill application 122 may specify a tenant application, such as the tenant application 114, as the object of the recovery drill. The recovery drill application 122 proceeds to query one or more data sources (e.g., one of more of the data sources 124, the MP driver 156, and/or other data sources) within the data center environment 100, to identify storage path constructs involved in handling the data of the tenant application 114. The recovery drill application 122 then evaluates the identified storage path constructs, or some subset of the identified storage path constructs, and generates an assessment of the fault tolerance of each respective storage path construct. The recovery drill application 122 then applies a set of rules to the assessments to yield an overall assessment of safety of the tenant application data. The recovery drill application 122 may generate one or more reports.

In some examples, evaluating the identified storage path constructs involves assessing the level of redundancy for each storage path construct. The recovery drill application 122 may simulate failures of different storage path constructs and identifies the consequences of each such failure. The recovery drill application 122 may also simulate the failure of the entire data center environment 100 and to assess the ability to apply off-site, redundant clones and/or snaps of the tenant data to fully restore the tenant data.

In an example, the recovery drill application 122 also performs an impact analysis to assess any data center failure from the perspective of business continuity. The recovery drill application 122 takes into account financial, operational, and service impacts of any data center failure. Vulnerabilities and fault tolerance to single point failures are also assessed and reported.

Figure 2:
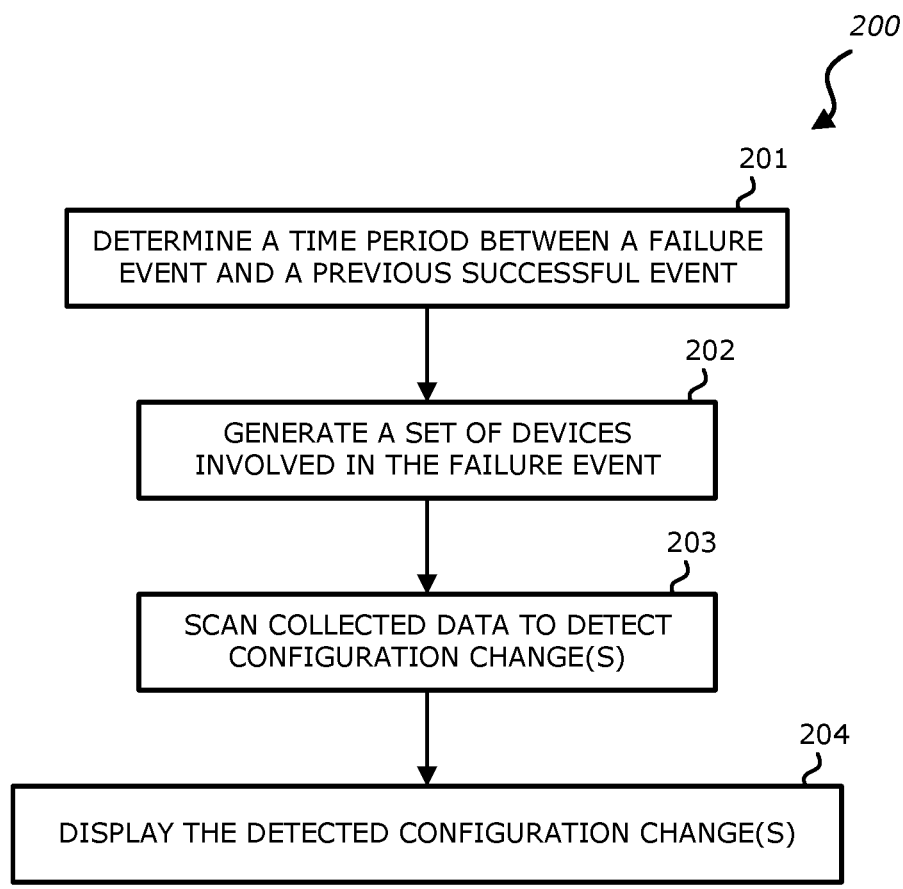
FIG. 2 illustrates a flow diagram for explaining an example process for detecting a cause of an error that occurred in the data center of FIG. 1, according to an embodiment herein.

FIG. 2 illustrates a flow diagram for explaining an example process for detecting the cause of an error in a data center according to an embodiment herein. In this regard, the following embodiments may be described as a process 200, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 200 may be performed by processing logic that includes hardware (e.g. circuitry, dedicated logic, etc.), software (e.g., embodied on a non-transitory computer readable medium), or a combination thereof.

A data protection advisor (DPA) application supports collecting time series data of devices, configuration details and events of a data center such as the data center of FIG. 1. In one embodiment, a strict distinction is made between the following types of data: configuration data (e.g., data related to setting up an IP address, setting cache size, upgrading a product version, etc.); status data (e.g., data related to a temperature of a central processing unit (CPU), an amount of utilization of the file system, etc.); event data (e.g., data related to things that happened in the system over time, such as a "successful event" or a "failure event" etc.); mappings (e.g., data indicating a correlation between devices, such as a host backed up by a server or a file system mounted on an array, etc.)

The DPA may monitor collection of the various types of data, for example, configuration data as compared to event data. The DPA may also detect changes in configuration, for example, configuration changes made by a human user. The DPA may further perform information queries related to historical mapping of data.

As previously mentioned, for events that occur periodically in the data center, such as performance of a backup or replication of data, occurrence of an error may be automatically detected, and the cause of the error may be determined such that feedback may be provided to a user, including suggested approaches for resolving the error. In one embodiment, a possible human-related cause of the failure of the periodic event is detected.

Referring to FIG. 2, at block 201, a time period between a failure event in the data center and a previous successful event is determined. The failure event, can be, for example, a failed backup job. At block 202, a set of devices involved in the failure event is generated using the DPA described above. The set of device can be generated based on a correlation between the devices. The correlation between the devices can be based on historical mapping information queries described above. At block 203, data collected for the set of devices during the determined time period is scanned to detect one or more configuration changes made during the time period determined at block 201. The collected data includes, among other things, configuration data, status data and event data described above. At block 204, the one or more configuration changes are displayed on a user interface to a user as a potential root cause of the error based on a result of the scanned collected data. In one embodiment, the one or more configuration changes are displayed on a user interface together with at least one resolution, the resolution being provided in accordance with the one or more configuration changes. The resolution may include a suggested action to remedy the error.

By virtue of the embodiments discussed herein, it is possible to easily determine a cause of an error in a large data center. More specifically, for events that occur periodically in the data center, such as performance of a backup or replication of data, the embodiments discussed herein make it possible to automatically detect possible causes of an error and provide feedback to a user including possible resolutions. In this way, errors caused by configuration changes made by a human user may be isolated from the other activities of the data center, and it is possible to accurately and quickly identify a root cause of an error and remedy the error.

Figure 3:
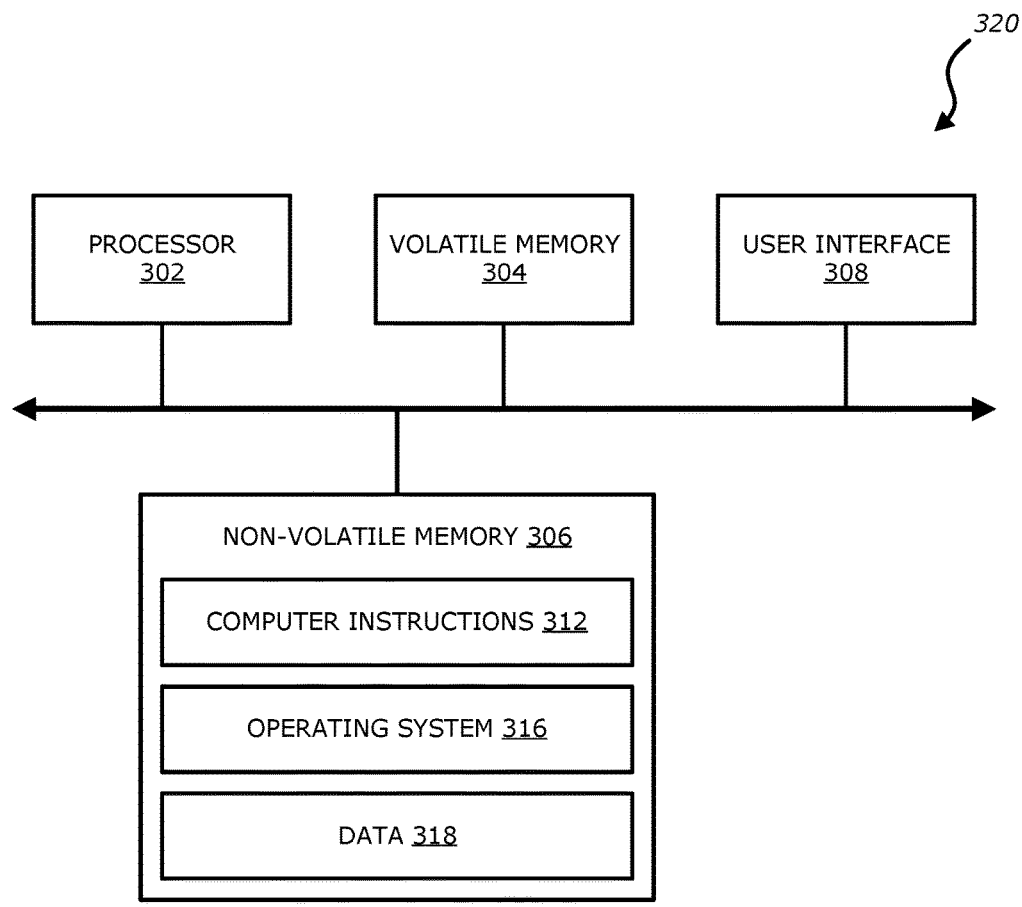
FIG. 3 illustrates a block diagram for explaining an example data processing system on which any portion of the process of FIG. 2 may be implemented according to an embodiment herein.

In an example case, where a host backup job failed, the embodiments described herein may automatically detect the following known causes without any further configuration:

1) Host IP address changed
2) Backup server software upgraded
3) Backup server configuration changed (client configuration)
4) Host OS upgraded
5) Ethernet port configuration change
6) Upgrade/configuration change to backup target appliance/tape library
7) Host disk replaced (local or SAN)
8) Applications on host upgraded/configuration changed FIG. 3 illustrates a block diagram of an example of a data processing system which may be used with one embodiment herein. For example, system 320 may represent any of data processing systems described above performing any of the processes or methods described above. System 320 may include many different components that can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 320 is intended to show a high level view of many components of the computer system. However, it is to be understood that additional components may be present in certain implementations and furthermore, different arrangement of the components shown may occur in other implementations. System 320 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

System 320 includes a processor 302, a volatile memory 304, a non-volatile memory 306 (e.g., hard disk) and a user interface (UI) 308 (e.g., a graphical user interface, a mouse, a touch pad, a touch sensitive screen, a display, a pointer device such as a stylus, a keyboard, and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200). In addition, executable code and/or data of a variety of operating systems, device drivers, firmware (e.g., input output basic system or BIOS), and/or applications can be loaded in the memory and executed by processor 302.

In one embodiment, system 320 may also include input/output devices (not shown) such as audio devices (e.g., a speaker, a microphone), universal serial bus (USB) ports, parallel ports, serial ports, a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Input/output devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system 320.

To provide for persistent storage of information such as data, applications, one or more operating systems and so forth, a mass storage (not shown) may also couple to processor 302. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 302, e.g., via a serial peripheral interface (SPI). This flash device may provide for non-volatile storage of system software, including a basic input/output software (BIOS) as well as other firmware of the system.

Processor 302 may represent a single processor or multiple processors with a single processor core or multiple processor cores included therein. Processor 302 may represent one or more general-purpose processors such as a microprocessor, a central processing unit (CPU), or the like. More particularly, processor 302 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 302 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 302, which may be a low power multi-core processor socket such as an ultra-low voltage processor, may act as a main processing unit and central hub for communication with the various components of the system. Such processor can be implemented as a system on chip (SoC).

According to one example embodiment, debugging module 125 is stored in non-volatile memory 306 and is executed by the processor 302 to cause system 320 to function in accordance with the techniques discussed herein.

FIG. 3 is merely one example of a particular implementation and is merely intended to illustrate the types of components that may be present in the system 320. Note that while system 320 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other case management systems which have fewer components or perhaps more components may also be used with embodiments herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium. The terms "computer-readable storage medium" and "machine-readable storage medium" should be taken to include a single medium or multiple media (e.g., a centralized or distributed database, and/or associated caches and servers) that store the one or more sets of instructions.

The processes described herein are not limited to the specific examples described. For example, process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, process 200 can be implemented in any combination hardware devices and software components.

While several embodiments have been described herein, those of ordinary skill in the art will recognize that the embodiments are merely examples and can be practiced with modification and alteration within the spirit and scope of the appended claims. In addition, elements of different embodiments described herein may be combined to form other embodiments not specifically set forth above. The description is thus to be regarded as illustrative instead of limiting. There are numerous other variations to different aspects of the embodiments described above, which in the interest of conciseness have not been provided in detail. Accordingly, other embodiments are within the scope of the claims.

The invention claimed is:

1. A method for detecting a cause of an error occurring in a data center, the method comprising:
   determining a time period between a failure event in the data center and a previous successful event;
   generating, using a data protection advisor (DPA), a set of devices involved in the failure event, wherein the set of devices is generated based on a correlation between the devices, wherein the correlation between the devices is based on historical mapping information queries, and wherein the historical mapping information comprises at least a first mapping between a server and a host backed up by the server and a second mapping between an array and a file system mounted on the array;
   scanning data collected for the set of devices during the determined time period to detect at least one configuration change made during the determined time period; and
   displaying, based on a result of the scanned collected data, the at least one configuration change as a potential root cause of the error.

2. The method of claim 1 wherein the collected data comprises configuration data, status data and event data.

3. The method of claim 1 wherein the at least one configuration change is displayed on a user interface together with at least one resolution, the at least one resolution being based on the at least one configuration change.

4. The method of claim 1 wherein the failure event is a failed backup job.

5. A system for detecting a cause of an error occurring in a data center, the system comprising:
   electronic hardware circuitry constructed to:
   determine a time period between a failure event in the data center and a previous successful event;
   generate, using a data protection advisor (DPA), a set of devices involved in the failure event, wherein the set of devices is generated based on a correlation between the devices, wherein the correlation between the devices is based on historical mapping information queries, and wherein the historical mapping information comprises at least a first mapping between a server and a host backed up by the server and a second mapping between an array and a file system mounted on the array;
   scan data collected for the set of devices during the determined time period to detect at least one configuration change made during the determined time period; and
   display, based on a result of the scanned collected data, the at least one configuration change as a potential root cause of the error.

6. The system of claim 5 wherein the collected data comprises configuration data, status data and event data.

7. The system of claim 5 wherein the at least one configuration change is displayed on a user interface together with at least one resolution, the at least one resolution being based on the at least one configuration change.

8. The system of claim 5 wherein the failure event is a failed backup job.

9. A non-transitory computer-readable storage medium storing computer-executable instructions, the instructions causing a machine to execute a process comprising:
   determining a time period between a failure event in a data center and a previous successful event;
   generating, using a data protection advisor (DPA), a set of devices involved in the failure event, wherein the set of devices is generated based on a correlation between the devices, wherein the correlation between the devices is based on historical mapping information queries, and wherein the historical mapping information comprises at least a first mapping between a server and a host backed up by the server and a second mapping between an array and a file system mounted on the array;
   scanning data collected for the set of devices during the determined time period to detect at least one configuration change made during the determined time period; and
   displaying, based on a result of the scanned collected data, the at least one configuration change as a potential root cause of an error.

10. The non-transitory computer-readable storage medium of claim 9 wherein the collected data comprises configuration data, status data and event data.

11. The non-transitory computer-readable storage medium of claim 9 wherein the at least one configuration change is displayed on a user interface together with at least one resolution, the at least one resolution being based on the at least one configuration change.

12. The non-transitory computer-readable storage medium of claim 9 wherein the failure event is a failed backup job.

\* \* \* \* \*